United States Patent
Siddiqui (10) Patent No.: US 12,456,240 B2
(45) Date of Patent: Oct. 28, 2025

(54) FIDUCIAL LOCALIZATION WITH SPARSE ANNOTATIONS

(71) Applicant: ImmunityBio, Inc., Culver City, CA (US)

(72) Inventor: Matheen Siddiqui, Culver City, CA (US)

(73) Assignee: ImmunityBio, Inc., Culver City, CA (US)

( * ) Notice: Subject to any disclaimer, the term of this patent is extended or adjusted under 35 U.S.C. 154(b) by 210 days.

(21) Appl. No.: 18/084,226

(22) Filed: Dec. 19, 2022

(65) Prior Publication Data

US 2024/0202997 A1    Jun. 20, 2024

(51) Int. Cl.
G06T 11/20    (2006.01)

(52) U.S. Cl.
CPC ........ *G06T 11/206* (2013.01); *G06T 2210/22* (2013.01); *G06T 2210/41* (2013.01)

(58) Field of Classification Search
CPC .......................... G06T 11/206; G06T 2210/22; G06T 2210/41
See application file for complete search history.

(56) References Cited

U.S. PATENT DOCUMENTS

| | | |
|---|---|---|
| 2012/0330170 A1 | 12/2012 | Chiu et al. |
| 2015/0227702 A1 | 8/2015 | Krishna et al. |
| 2019/0156204 A1* | 5/2019 | Bresch .................. G06N 3/08 |
| 2021/0386355 A1 | 12/2021 | Ravuna et al. |
| 2022/0156934 A1 | 5/2022 | Lyman et al. |
| 2023/0306267 A1* | 9/2023 | Jacob Banville ..... G06N 3/0464 |
| 2023/0359927 A1* | 11/2023 | Gogin .................... G06N 3/10 |

FOREIGN PATENT DOCUMENTS

WO    WO 2022/020968    2/2022

OTHER PUBLICATIONS

International Search Report and Written Opinion for International (PCT) Patent Application No. PCT/US23/84949, dated May 15, 2024 9 pages.
Moskalenko et al., "Deep Learning for ECG Segmentation," Lobachevsky University of Nzhni Novgorod, Jan. 14, 2020, retrieved from: https://arxiv.org/pdf/2001.04689.pdf, 10 pages.
"Pan-Tompkins algorithm," Wikipedia, retrieved from: https://en.wikipedia.org/wiki/Pan-Tompkins_algorithm, last edited Jan. 7, 2023, 3 pages.

* cited by examiner

*Primary Examiner* — Sing-Wai Wu
(74) *Attorney, Agent, or Firm* — Sheridan Ross P.C.

(57) ABSTRACT

A system and method are described. An illustrative method includes receiving a digital dataset representing waveform data comprising the waveform, windowing the digital dataset such that no more than two periods of the waveform exist within a windowed version of the digital dataset, providing the windowed version of the dataset to a trained machine learning model, receiving an output signal from the trained machine learning model, where the output signal is generated by the machine learning model in response to the trained machine learning model processing the windowed version of the dataset, generating the heatmap with the output signal received from the trained machine learning model, and causing a device to take action based on the heatmap.

5 Claims, 11 Drawing Sheets

FIDUCIAL LOCALIZATION WITH SPARSE ANNOTATIONS

FIELD OF THE DISCLOSURE

Embodiments of the present disclosure relate to systems and methods for processing signals including, without limitation, a digital dataset representing waveform data and for mapping the waveform data to a heatmap.

BACKGROUND

The background description includes information that may be useful in understanding the present inventive subject matter. It is not an admission that any of the information provided herein is prior art or relevant to the presently claimed invention, or that any publication specifically or implicitly referenced is prior art.

Detecting and localizing beats (or other features) in an Electrocardiogram (ECG) waveform is a fundamental first step in waveform analysis. Many waveform analysis processes rely on transforming a waveform to a heatmap. From the heatmap, estimated heatmap peaks can be found and correlated back to fiducials from the original waveform. Current approaches require that each waveform be fully annotated before being transformed into a heatmap. In other words, current transformation approaches require that every fiducial in the waveform be annotated, which can be a time consuming and difficult process.

SUMMARY

All external references are hereby incorporated by reference in their entirety whether explicitly stated or not.

It is with respect to the above problems that embodiments of the present disclosure were contemplated. As mentioned above, detecting and localizing beats in an ECG waveform is a fundamental first step in waveform analysis. In recent years, machine learning methods have been developed to transform an ECG waveform to a heatmap, where the heatmap indicates both location and presence of a location of a particular fiducial along the waveform. In some examples, the waveform may be transformed into a heatmap that corresponds to the R fiducial along the waveform. While some examples will be depicted and described in connection with particular fiducials (e.g., the R fiducial), it should be appreciated that embodiments described herein are not limited to a particular fiducial. Rather, embodiments of the present disclosure may be applied to any fiducial (e.g., P, Q, R, S, or T fiducial) or combination of fiducials without departing from the scope and sprit of the present disclosure.

In some embodiments, the heatmap may include a peak that corresponds with the location of each annotated fiducial. If all of a particular fiducial (e.g., the R fiducial) are known in advance of transformation (e.g., through human annotation of the waveform), then the heatmap can be constructed using any decaying function. An illustrative decaying function that can be used to construct a heatmap is provided below:

$$R[x] = e^{-distToClosest(x)^2} \quad \text{Equation (0)}$$

From many such examples (waveform+heatmap), a deep learning model can be trained to learn a mapping between the waveform and the heatmap. After a sufficient amount of training, the deep learning model can become the basis of a fiducial detector. Furthermore, from the estimated heatmap, waveform peaks or other fiducials can be detected.

As noted above, traditional mapping processes require that each waveform be fully annotated (e.g., that every fiducial is annotated). An aspect of the present disclosure is to reduce the annotation requirements needed to produce a heatmap regressor. More specifically, in some embodiments, a system and method are provided in which less than all fiducials need to be annotated. In some embodiments, it may be possible to realize a waveform-to-heatmap transformation while only requiring the fiducials of one beat per waveform to be annotated. From such minimal annotation requirements, a heatmap estimator built in accordance with embodiments of the present disclosure can generalize to the unannotated portions of the waveform as well as new data. Minimizing annotation requirements in this way provides significant advantages over other approaches. Indeed, massively reducing the annotation requirements to realize an accurate waveform-to-heatmap transformation, embodiments of the present disclosure can reduce errors due to inaccurate annotations, save time, and increase the number of transformations possible within a given timeframe.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Various objects, features, aspects and advantages of the inventive subject matter will become more apparent from the following detailed description of preferred embodiments, along with the accompanying drawing figures in which like numerals represent like components.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity may refer to one or more of that entity. As such, the terms "a" (or "an"), "one or more" and "at least one" can be used interchangeably herein. It is also to be noted that the terms "comprising", "including", and "having" can be used interchangeably. Also, as used in the description herein, the meaning of "in" includes "in" and "on" unless the context clearly dictates otherwise.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The present disclosure is described in conjunction with the appended figures, which are not necessarily drawn to scale.

DETAILED DESCRIPTION

Before any particular embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

The following discussion regarding the inventive subject matter is presented within the context of waveform annotation and waveform conversion/transformation to heatmaps. It should be appreciated that embodiments of the present disclosure are not limited to the concepts described herein. For instance, it may be possible to utilize embodiments of the present disclosure to realize transformations of any type of waveform to any type of heatmap or combination of heatmaps. Embodiments are also described in connection with training machine learning models to improve the transformation processes described herein. Those skilled in the art will appreciate that machine learning models trained according to the examples provided herein can be utilized to perform functions other than transforming a waveform to a heatmap. For instance, the machine learning models of the present disclosure can be used to facilitate automated machine responses to certain sensor inputs. As an example, automated actions may be triggered in response to detecting certain features within a partially or fully-annotated waveform, in response to detecting certain features within heatmaps yielded from a partially or fully-annotated waveform, or the like.

Embodiments of the present disclosure facilitate heatmap generation with less than full waveform annotation. In some embodiments, fiducials of one or two beats per waveform can be annotated and used to generate a heatmap for the waveform.

Figure 1:
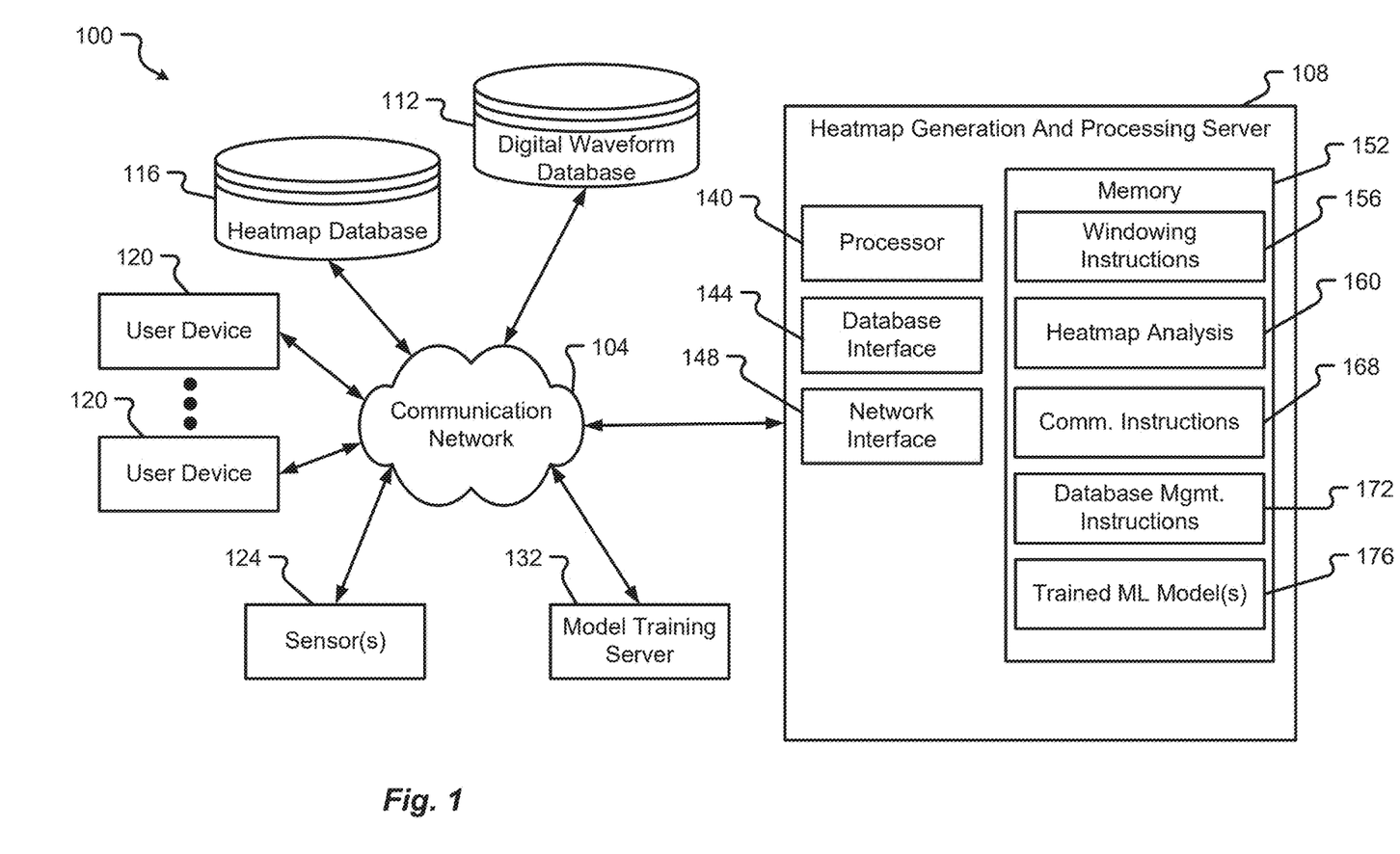
FIG. 1 is a block diagram depicting a system in accordance with at least some embodiments of the present disclosure.

With reference to FIG. 1 an illustrative system 100 will be described in accordance with at least some embodiments of the present disclosure. The system 100, in some embodiments, may include one or more computing devices operating alone or in cooperation with one another to provide waveform analytics, processing, transformation, or the like. The components of the system 100 may be utilized to facilitate one, some, or all of the methods described herein or portions thereof without departing from the scope of the present disclosure. Furthermore, although particular servers are depicted as including particular components or instruction sets, it should be appreciated that embodiments of the present disclosure are not so limited. For instance, a plurality of servers may be provided with certain instruction sets depicted and described in the server of FIG. 1. Further, one should appreciate the functionality and corresponding facilities can be located in one or more computing devices. In some embodiments, the disclosed functionality may be located in a single device (e.g., a server, a computer, a mobile phone, etc.) or distributed among multiple devices; a server, a cloud infrastructure and a client device cooperating with each other, for example.

The system 100 is shown to include a communication network 104 that facilitates machine-to-machine communications between one or more of servers 108, 132 and/or one or more user devices 120. The server 108 is shown as a heatmap generation and processing server 108, but it should be appreciated that any type of server or collection of servers (e.g., a cloud-based system, etc.) may be provided to implement the functionality described in connection with the illustrative heatmap generation and processing server 108. For example, the model training server 132 may implement a portion or all of the functionality described in connection with the heatmap generation and processing server 108, or vice versa.

The communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VOIP) network, a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

The user device 120 may correspond to any type of computing resource that includes at least one processor, a non-transitory computer memory, and a user interface (e.g., a display, a keyboard, etc.). Non-limiting examples of a user device 120 include personal computers, laptops, mobile phones, smart phones, tablets, wearable devices, game devices, game consoles, appliances, kiosks, vehicles, etc. In some embodiments, the user device 120 is configured to be used by and/or carried by a user. As will be discussed in further detail herein, the user may utilize a user device 120 to receive information from the heatmap generation and processing server 108. Alternatively or additionally, the heatmap generation and processing server 108 may initiate triggers that cause the user device 120 to perform one or more actions automatically in response to receiving such triggers. In some embodiments, the heatmap generation and processing server 108 may generate triggers for user devices 120 based on an analysis of waveforms, heatmaps, combinations thereof, and the like. It may also be possible that the heatmap generation and processing server 108 may automatically transmit one or more messages or alerts to user devices 120 based on an outcome of a waveform and/or heatmap analysis.

The heatmap generation and processing server 108 may be configured to execute one or multiple different types of instruction sets in connection with receiving, storing, managing, transferring, transforming, analyzing, and/or triggering actions as described herein. The heatmap generation and processing server 108 may also (additionally or alternatively) be configured to leverage one or more machine learning models as part of receiving, storing, managing, transferring, transforming, analyzing, and/or triggering actions as described herein. The instruction sets may work independently and/or in concert with machine learning models to realize the functionality of the heatmap generation and processing server 108.

The heatmap generation and processing server 108 is shown to include a processor 140, a database interface 144, a network interface 148, and memory 152. These resources of the heatmap generation and processing server 108 may enable functionality of the heatmap generation and processing server 108 as will be described herein. For instance, the network interface 148 provides the heatmap generation and processing server 108 with the ability to send and receive communication packets over the communication network 104. The network interface 148 may be provided as a network interface card (NIC), a wireless port, a network port, drivers for the same, and the like. Communications between the components of the heatmap generation and processing server 108 and other devices connected to the communication network 104 may all flow through the network interface 148.

The model training server 132 may be configured to execute one or multiple different types of instruction sets in connection with preparing, training, and/or validating machine learning models. Additional details of the model training server 132 will be described in connection with FIG. 2; however, it should be appreciated that the model training server 132 may be responsible for generating one or more machine learning models (e.g., trained machine learning models 176) that are used by the heatmap generation and processing server 108. The model training server 132 may also be responsible for updating, re-training, and/or replacing machine learning models already in production and use by the heatmap generation and processing server 108.

The processor 140 may correspond to one or many computer processing devices. For instance, the processor 140 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 140 may be provided as a microprocessor, Central Processing Unit (CPU), or plurality of microprocessors, possibly having multiple cores, that are configured to execute the instructions sets and/or machine learning models stored in memory 152. Upon executing the instruction sets and/or machine learning models stored in memory 152, the processor 140 enables various functions of the heatmap generation and processing server 108.

In some embodiments, the database interface 144 may be provided as a physical set of database links and drivers. Alternatively, or additionally, the database interface 144 may be provided as one or more instruction sets in memory 152 that enable the processor 140 to interact with one or more databases 112 and/or 116. The heatmap generation and processing server 108 may be connected with a database 112 and/or 116 via the communication network 104. Alternatively or additionally, the heatmap generation and processing server 108 may be connected directly with one or both databases 112, 116.

Examples of databases that may be utilized in accordance with at least some embodiments include a digital waveform database 112 and a heatmap database 116. The digital waveform database 112 may provide a repository for digital datasets representing waveform data. In other words, the digital waveform database 112 may be used to store one or a plurality of ECG waveforms. To the extent that such data is sensitive (e.g., includes patient data), the database may be encrypted or content thereof may be secured such that access to the data is limited to persons or device that successfully complete an authentication process. It may also be possible to organize the data stored in the digital waveform database 112 such that knowledge of a secret is required to successfully retrieve particular digital datasets.

The heatmap generation and processing server 108 may also have access to and interact with the heatmap database 116. Similar to the digital waveform database 112, the heatmap database 116 may include information that is considered sensitive and requires secure handling. Access to data stored in the heatmap database 116 may be limited to those entities that successfully authenticate themselves with the heatmap database 116, thereby proving their access privileges to requested data.

In some embodiments, the database management instructions 172, when executed by the processor 140, may enable the heatmap generation and processing server 108 to access data contained in the databases 112, 116. In some embodiments, the database management instructions 172 may also enable the heatmap generation and processing server 108 to store data in a database and link data stored in one database with other data, which can be stored in the same database or another database. As an example, the database management instructions 172 may be configured to retrieve digital datasets from the digital waveform database 112 and then store corresponding heatmaps generated within the heatmap generation and processing server 108 into the heatmap database 116. The heatmap generation and processing server 108 may also be configured to establish links between heatmaps stored in the heatmap database 116 with digital waveforms stored in the digital waveform database 112. Such links between data of the different databases 112, 116 may be used to support inferences and/or training of machine learning models.

The memory 152 may include any type of computer memory device or collection of computer memory devices. Non-limiting examples of memory 152 include Random Access Memory (RAM), Read Only Memory (ROM), flash memory, Electronically-Erasable Programmable ROM (EEPROM), Dynamic RAM (DRAM), etc. The memory 152 may be configured to store the instruction sets and/or machine learning models depicted in addition to temporarily storing data for the processor 140 to execute various types of routines or functions.

In some embodiments, the communication instructions 168, when executed by the processor 140, may enable the heatmap generation and processing server 108 to interact with other machines in the system 100. In particular, the communication instructions 168 may be configured to enable machine-to-machine communication via the communication network 104. As will be discussed in further detail herein, the communication instructions 168 may also include rules that cooperate with the heatmap analysis instructions 160 to determine when automated communications are transmitted to another server 132 and/or user device 120. Such automated communications may be triggered in response to the heatmap analysis instructions 160 detecting certain features, anomalies, or indicators when analyzing a heatmap. In other words, the communication instructions 168 may be configured to automatically initiate a process when a heatmap satisfies an action selection criteria(ion). In some embodiments, the communication instructions 168 may be configured to transmit instructions or commands to a user device 120 and/or server 132 that causes the receiving device to automatically initiate a process in response to receiving the instructions or commands. In this way, the communication instructions 168 may be configured to cause a device to take an action based on an analysis of heatmaps, as will be described in further detail herein. Examples of such actions include automated notifications, automated instructions, sounding alarms, calling emergency response personnel, dispatching emergency response personnel, etc.

The heatmap analysis instructions 160, when executed by the processor 140, may enable the heatmap generation and processing server 108 to analyze heatmaps that are generated from digital datasets representing waveform data. In other words, the heatmap analysis instructions 160 may be configured to analyze heatmaps and/or features of heatmaps as described herein to determine whether a patient's data (e.g., ECG waveform) is normal, anomalous, changing, remaining steady, returning to normal, etc. The heatmap analysis instructions 160 may be configured to provide results of its heatmap analysis to the communication instructions 168, thereby facilitating automated processes to be triggered.

The windowing instructions 156, when executed by the processor 140, may enable the heatmap generation and processing server 108 to receive a digital dataset representing waveform data, then begin processing the digital dataset. In particular, the windowing instructions 156 may be configured to window portions of the waveform such that nor more than two periods of the waveform exist within a windowed version of the digital dataset. The windowing instructions 156 can be used as part of transforming the digital dataset representing waveform data into a heatmap. Utilizing a windowed version of a waveform enables less annotating of the waveform as compared to traditional transformation processes. Additionally, the windowing instructions 156 may be configured to cooperate with and/or leverage trained machine learning models 176 as part of generating a heatmap from the digital dataset representing waveform data. More specifically, the windowing instructions 156 may be configured to window the digital dataset as described herein, then provide the windowed version of the dataset to a trained machine learning model 176. The trained machine learning model 176 have been estimated from sparsely-annotated digital dataset and may generate a heatmap for the windowed version of the digital dataset. The heatmap output by the trained machine learning model 176 may be provided to the heatmap analysis instructions 160 for analysis and further processing.

The trained machine learning model(s) 176, when executed by the processor 140, may enable the heatmap generation and processing server 108 to transform a windowed version of a digital dataset representing waveform data into a heatmap (or multiple heatmaps). In some embodiments, the trained machine learning model(s) 176 may be trained on various types of windowed digital dataset and may be configured to process waveforms having a limited number of annotations. Specifically, the trained machine learning model(s) 176 may include one or more machine learning models that are capable of receiving a digital dataset having one, two, three, . . . , ten, but less than all periods thereof annotated with one or more fiducials (e.g., a P, Q, R, S, and/or T fiducial). The trained machine learning model(s) 176 may output a heatmap that corresponds to a transformation of the sparsely-annotated digital dataset, which can then be analyzed by the heatmap analysis instructions 160.

Figure 2:
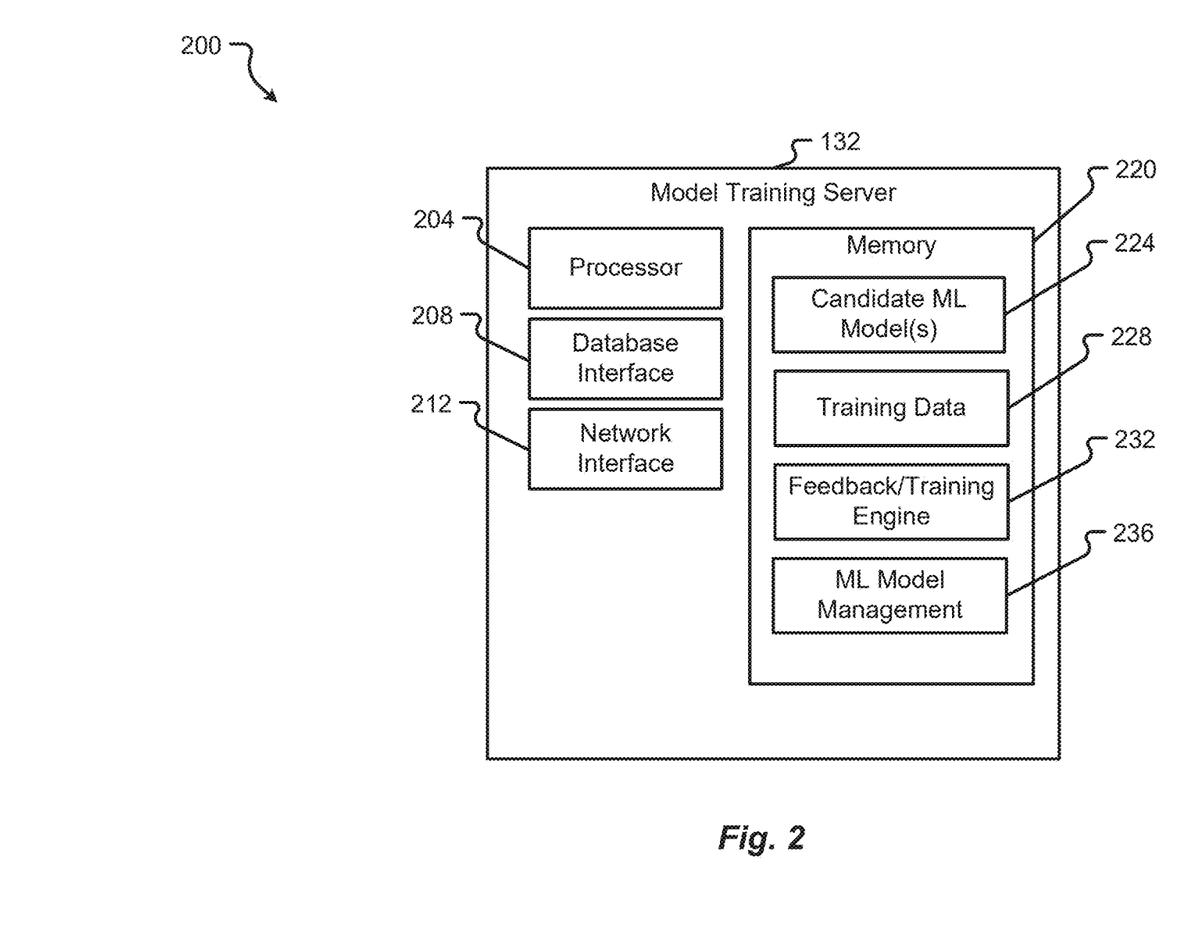
FIG. 2 is a block diagram depicting a server in accordance with at least some embodiments of the present disclosure.

With reference now to FIG. 2, additional details of a model training server 132 that can be used to generate one or more trained machine learning models 176 will be described in accordance with at least some embodiments of the present disclosure. A model training server 132 may correspond to one or multiple devices that include one or more instruction sets that enable an efficient and accurate creation of trained machine learning model(s) 176.

The model training server 132 as shown includes a processor 204, a database interface 208, a network interface 212, and computer memory 220. The processor 204 may correspond to one or multiple processing circuits. In some embodiments, the processor 204 may include a microprocessor, multi-core processor, an Integrated Circuit (IC) chip, FPGA, an ASIC, or the like. The processor 204 may be configured with a plurality of logic circuits or circuit elements that enable the processor 204 to execute one or more instructions or instruction sets maintained in memory 220. Alternatively, or additionally, the processor 204 may be configured to execute instructions for operating the database interface 208 and/or network interface 212. As an example, the processor 204 may be configured to execute one or more drivers that are specifically provided for the database interface 208 and/or network interface 212.

The memory 220 may be in communication with the processor 204. The memory 220 may include any type or combination of computer memory devices. Non-limiting examples of memory 220 include flash memory, volatile memory, non-volatile memory, RAM, NVRAM, SRAM, ROM, EEPROM, SSD, HDD, etc. As can be appreciated, the types of devices used for memory 220 may depend upon the nature and type of data stored in memory 220.

In the depicted embodiment, the memory 220 includes one or a plurality of finite/closed-ended instruction sets that are executable by the processor 204. Non-limiting examples of instruction sets that may be provided in memory 220 include a feedback/training engine 232 and/or machine learning model management instructions 236. The memory 220 may also store training data 228 that is used to train one or more candidate machine learning models 224. The feedback/training engine 232 may be configured to feed training data 228 to one or more candidate machine learning models 224, while such models are being trained and/or re-trained. The feedback/training engine 232 can then receive outputs from the candidate machine learning models 224 and provide feedback to the models, thereby helping the models 224 in their training process. In some embodiments, the feedback/training engine 232 may include one or more machine learning models that are configured to train other machine learning models. Alternatively or additionally, the feedback/training engine 232 may include instructions that enable automated and/or user-assisted training of the candidate machine learning models 224.

The machine learning model management instructions 236 may be configured to interact with the feedback/training engine 232 to determine if/when a candidate machine learning model 224 has been sufficiently trained. When a candidate model has been sufficiently trained (e.g., has been trained for a predetermined amount of time, has been trained with a predetermined amount of training data 228, has been outputting results with a predetermined required level of accuracy, has been outputting results with a predetermined required level of confidence, etc.), then the machine learning model management instructions 236 may interact with the heatmap generation and processing server 108 to install sufficiently trained candidate machine learning models 224 in memory 152 for use in production (e.g., for use on actual patient data by the heatmap generation and processing server 108).

The database interface 208 may be similar or identical to database interface 144. In some embodiments, the database interface 210 may enable the model training server 132 to retrieve data from the digital waveform database 112 for use as training data 228. The database interface 208 may also be configured to retrieve data from the heatmap database for comparing against heatmaps generated by candidate machine learning models 224 (e.g., to validate whether or not a candidate machine learning model 224 is sufficiently trained and producing accurate heatmaps).

The network interface 212 provides hardware and drivers that enable the model training server 132 to connect with the network 104, receive communications from the network 104, and/or provide communications to the network 104 for delivery to another communication device (e.g., the heatmap generation and processing server 108 and/or another user device 120). In some embodiments, the network interface 212 includes a wired and/or wireless network adapter. Non-limiting examples of a network interface 212 include an antenna and associated driver (e.g., a WiFi or 802.11N antenna and/or driver), an Ethernet card and/or driver, a serial data port (e.g., a USB port) and/or driver, a Bluetooth or BLE antenna and/or driver, an NFC antenna and/or driver, or any other type of device that facilitates inter-device communications. The network interface 212 may receive one or more data packets or messages from the communication network 104 and extract data therefrom. The data extracted from the received data packets or messages may be provided to the processor 204 where the data can subsequently be processed using instructions stored in memory 220.

With reference now to FIGS. 3-12, various processes and methods of operating the system 100 or components therein will be described. It should be appreciated that any of the following processes or methods may be performed in part or in total by any of the components depicted and described in connection with FIGS. 1 and 2.

Before describing any particular method in detail, examples of waveform transformations, heatmap analysis, and other capabilities of the system 100 components will be described in accordance with at least some embodiments of the present disclosure.

Figure 3:
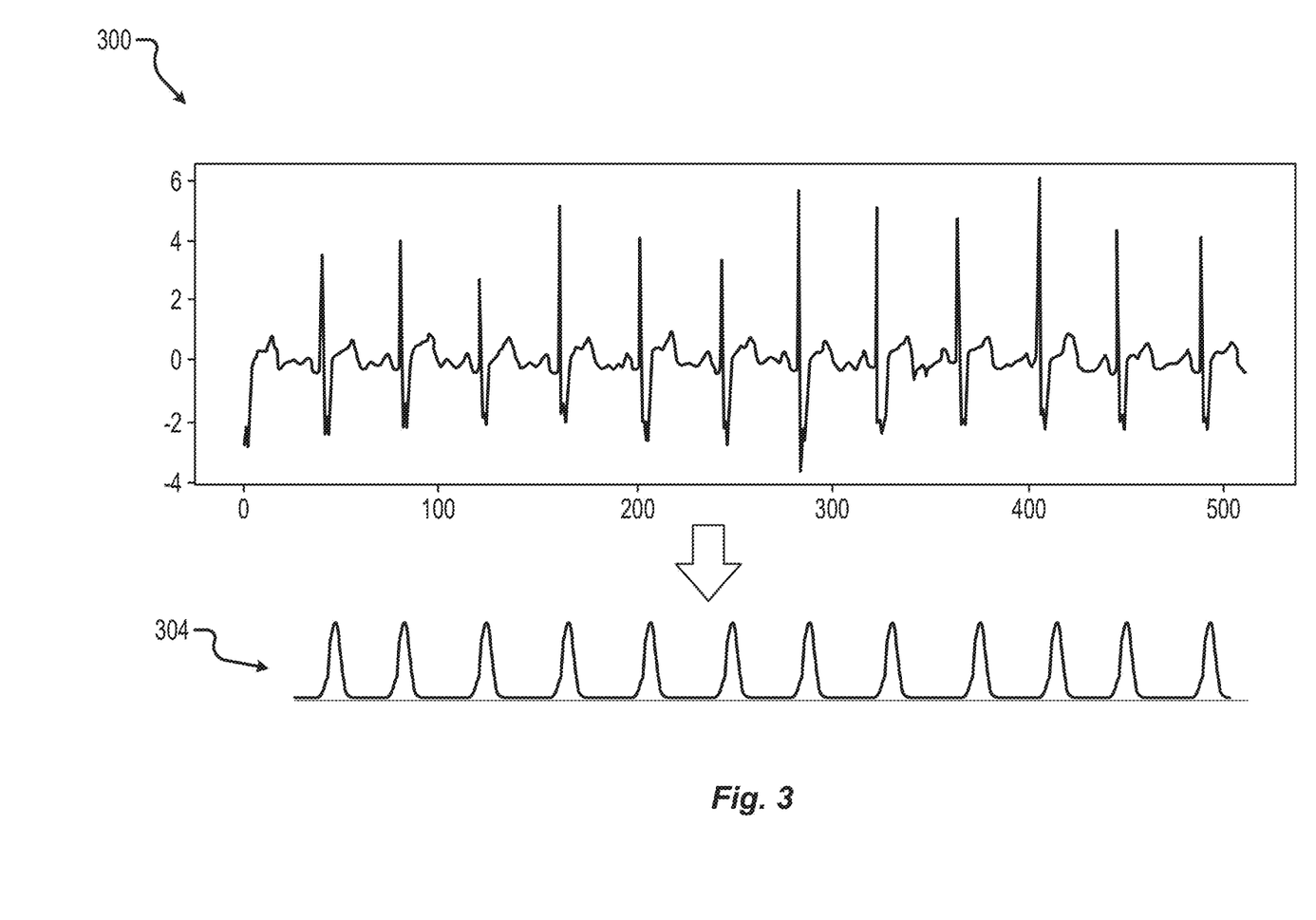
FIG. 3 is an example waveform being transformed into a heatmap in accordance with at least some embodiments of the present disclosure.

FIG. 3 illustrates a traditional process of transforming a waveform 300 into a heatmap 304. As shown in FIG. 3, a waveform (e.g., a digital dataset representing waveform data) 300 may be transformed into a heatmap 304 that corresponds to a particular fiducial (e.g., the R fiducial in this example) along the waveform. The heatmap 304 exhibits a peak that corresponds with a location of each R fiducial in the waveform 300. If all of the R's are known in advance through human annotation, the heatmap 304 can be constructed using any decaying function, for example:

$$R[x] = e^{-distToClosest(x)^2}$$  Equation (0)

From many such examples (e.g., waveform 300 plus heatmap 304) a deep learning model can learn a mapping to transform the waveform 300 to the heatmap 304 and the become the basis of a fiducial detector. From the estimated heatmap 304 peaks can be found. As mentioned above, a problem with employing the transformation process depicted in FIG. 3 is that each waveform 300 must be fully annotated to have an accounting in the heatmap 304.

Figure 4:
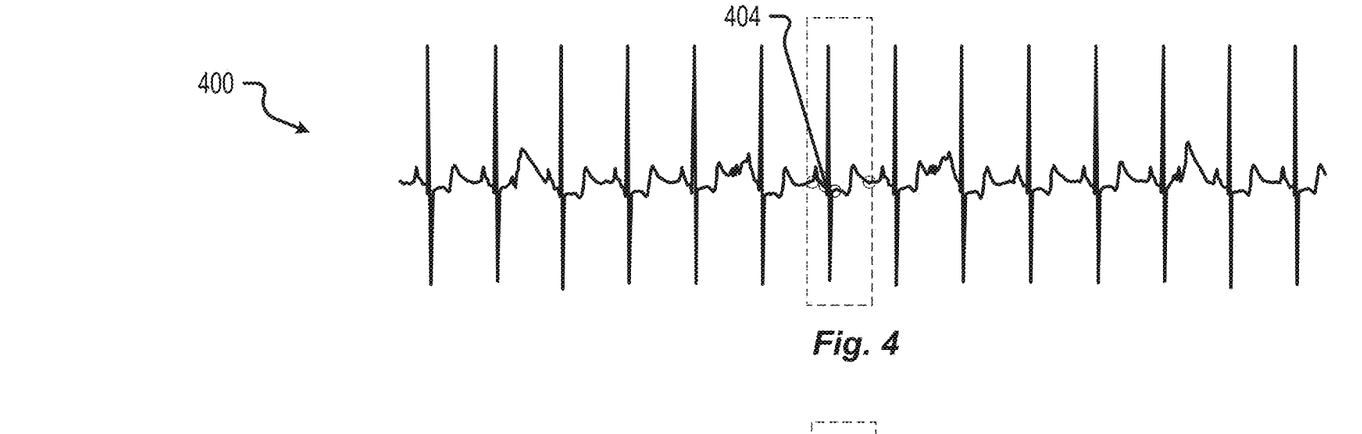
FIG. 4 is an example waveform having annotated fiducials in accordance with at least some embodiments of the present disclosure.
Figure 5:
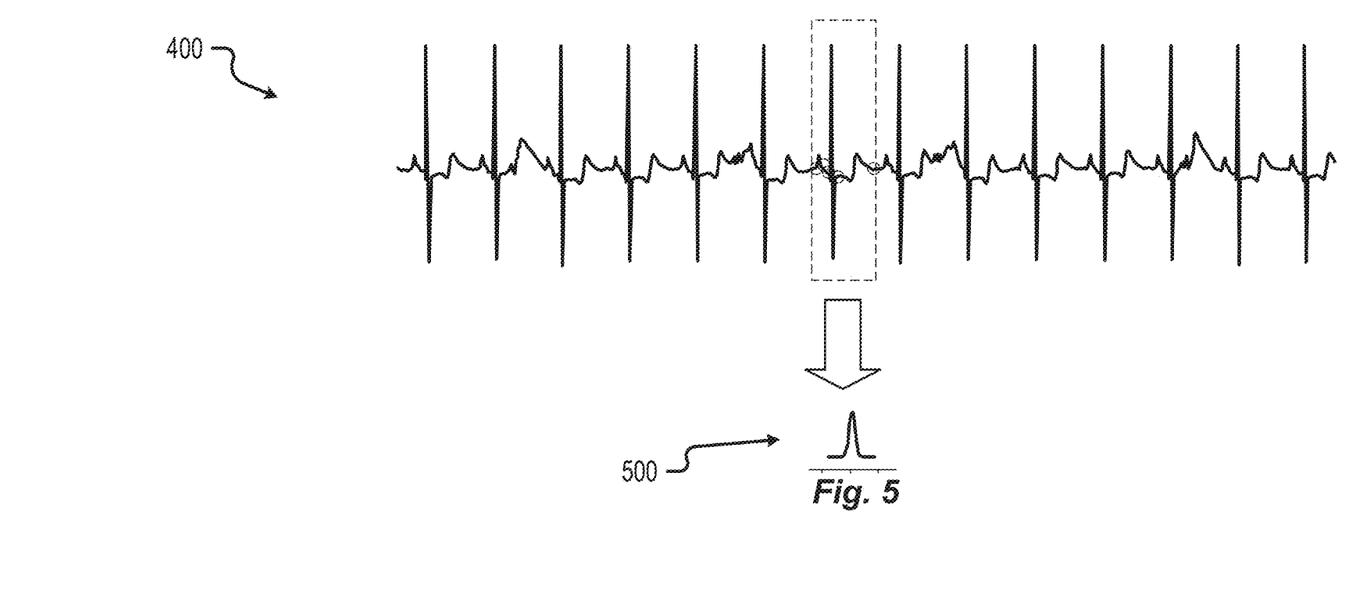
FIG. 5 is an example waveform having the annotated portion thereof used to construct a heatmap in accordance with at least some embodiments of the present disclosure.

FIGS. 4 and 5 illustrate how embodiments of the present disclosure can be applied to obtain a heatmap 500 from a waveform 400 that has less than all fiducials 404 annotated therein. In particular, and in accordance with at least some embodiments, the waveform 400 may have one or two periods thereof annotated with fiducial(s). In some embodiments, only one beat/period per waveform 400 needs annotation with fiducials 404.

Typically, a heatmap estimator will optimize the parameters of a model to minimize the difference between an estimated and predicted heatmap:

$$\sum_{i=1}^{N}\sum_{t=1}^{T} |Model(waveForm^i, \theta)[x] - R^i[t]|^2$$  Equation (1)

In the above equation, the parameters of the model, $\theta$, can be altered to minimize the difference between a set of ground truth heatmaps, $R^i[t]$, and heatmaps estimated from their corresponding waveforms. In prior work $R^i[t]$ is required to be valid throughout the domain of the waveform (e.g., for all time (t)).

Embodiments of the present disclosure, in contrast, only require a sparse set of fiducials 404 to be annotated. In particular, annotations of fiducial(s) for one beat per waveform is sufficient. This includes the PQRST fiducials as shown in FIG. 4.

With only a single beat annotated, embodiments of the present disclosure can construct a heatmap 500 (for R) locally around the annotated region as shown in FIG. 5. Inside the annotated region, a heatmap can be constructed as before (e.g., as if an entire waveform were annotated), but outside the highlighted region there is no known values for the annotations, therefore there are no peaks in the heatmap 500. Nevertheless, embodiments of the present disclosure can still make use of the partial information by modifying Equation 1 with a weighting term as shown below:

$$\sum_{i=1}^{N}\sum_{t=1}^{T} w^i[t] |\text{Model}(waveForm^i, \theta)[x] - R^i[t]|^2 \qquad \text{Equation (2)}$$

Figure 6:
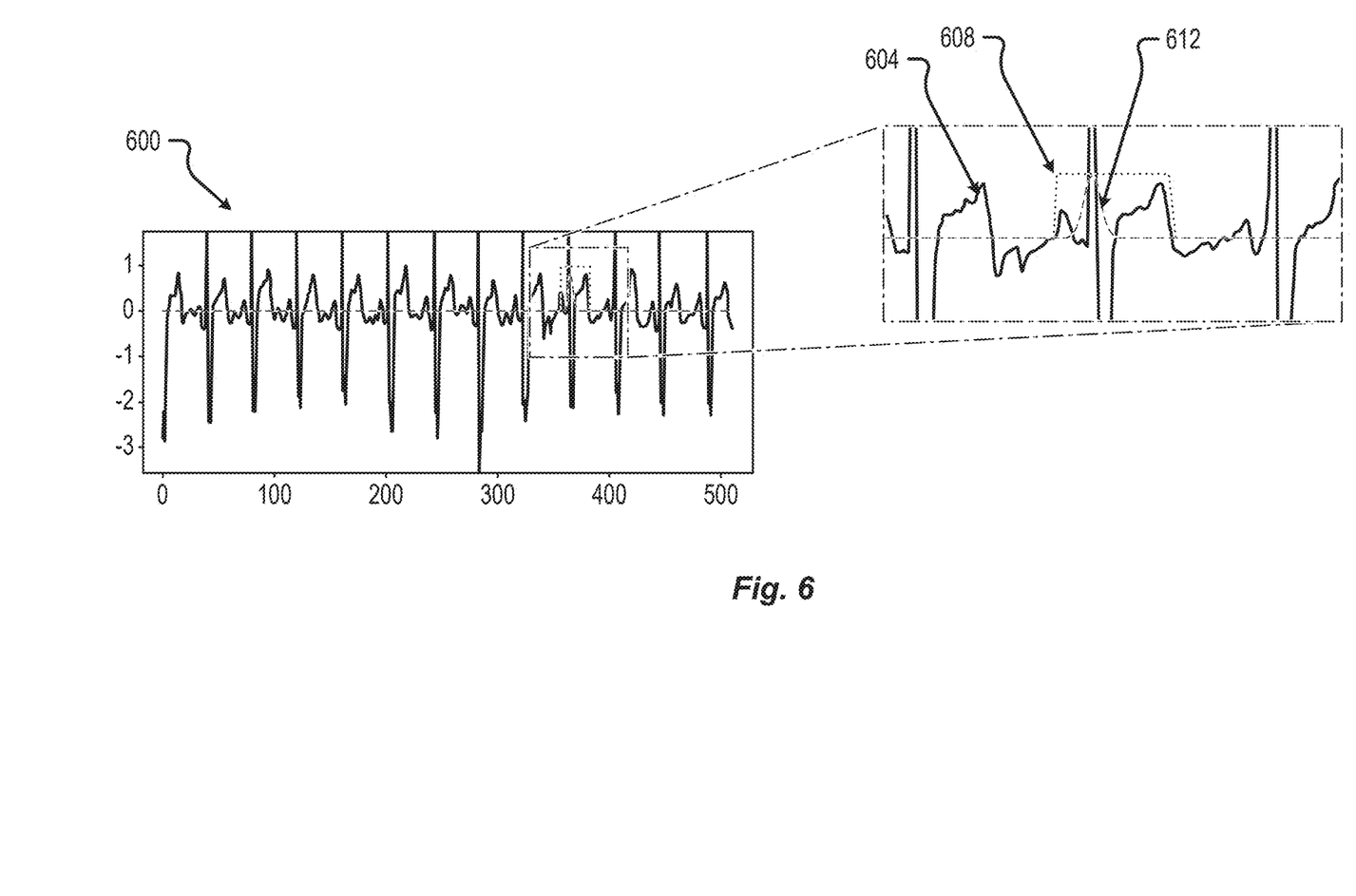
FIG. 6 illustrates details of a waveform along with a superimposed heatmap and weightings in accordance with at least some embodiments of the present disclosure.

Here $w^i[t]$ is one (1) inside the beat/period of interest, but zero (0) outside the beat/period of interest. Another visualization of this construction is shown in FIG. 6. Specifically, FIG. 6 illustrates an overlaid visualization where the waveform 604 has the weighting function 608 and heatmap 612 overlaid thereon. Using a weighting function 608 as illustrated in FIG. 6 provides an ability to integrate the information from individually annotated beats across the digital dataset (e.g., the waveform 604).

The success of finding a model to learn the mapping from waveform to heatmap across the domain of the waveform may benefit from, amongst the various waveforms (for I=1 . . . N), a good sampling of annotated beats across the domain (for t=1 . . . T). A comprehensive sampling may not be possible, however, but instead can be constructed by capturing a large window of the waveform around an annotated beat. The windowing instructions 152 can then be used to take a windowed slice of this large sample that contains the non-zero weighted region of the heatmap as shown in FIG. 7.

Figure 7:
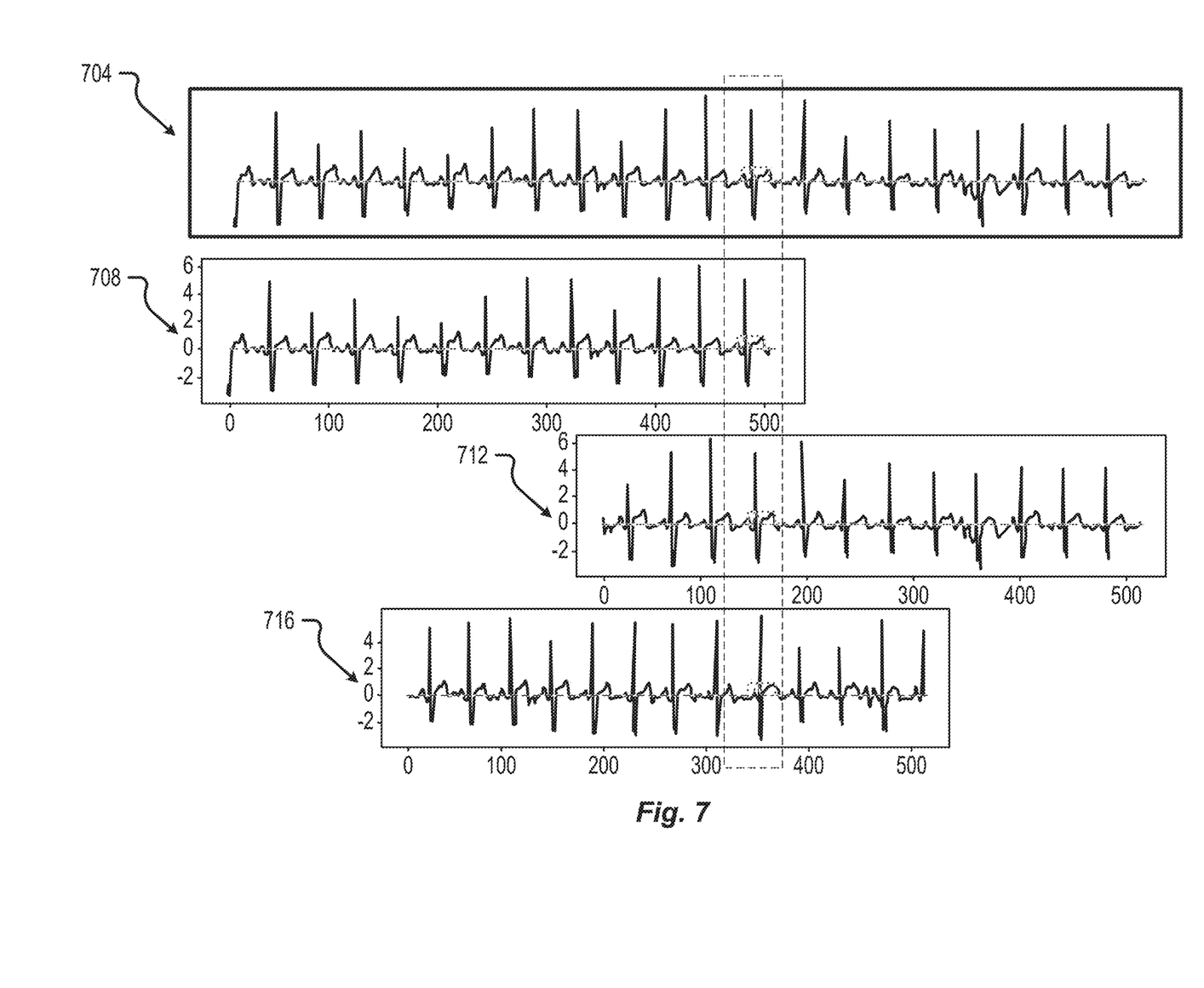
FIG. 7 illustrates examples of various windowed slices of a waveform in accordance with at least some embodiments of the present disclosure.

In the example of FIG. 7, the larger annotated waveform 704 is shown in the top row with a thick border. Below the larger(est) waveform 704 are multiple cropped waveforms 708, 712, 716, each of which contain the annotated beat and each of which can be used as waveform samples used to train a model by optimizing Equation (2). In some embodiments, one, two, three, four, or more different cropped waveforms 708, 712, 716 are created, each having different bounds (e.g., start and/or end points). In some embodiments, each cropped waveform 708, 712, 716 may have the same size (e.g., the same number of beats contained therein), but may have a different starting and ending beat. In some embodiments, one or more of the cropped waveforms 708, 712, 716 may have a different size from other cropped waveforms. In some embodiments, each of the cropped waveforms 708, 712, 716 are cropped to a common size. In some embodiments, each of the cropped waveforms 708, 712, 716 are cropped based on time and/or a number of beats. In some embodiments, at least two of the cropped waveforms 708, 712, 716 include the annotated beat at a different location. As will be discussed in further detail herein, the different cropped waveforms 708, 712, 716 can be used as training data 228 in the model training server 132 to train candidate machine learning models 224 for use as trained machine learning models 176.

Figure 8:
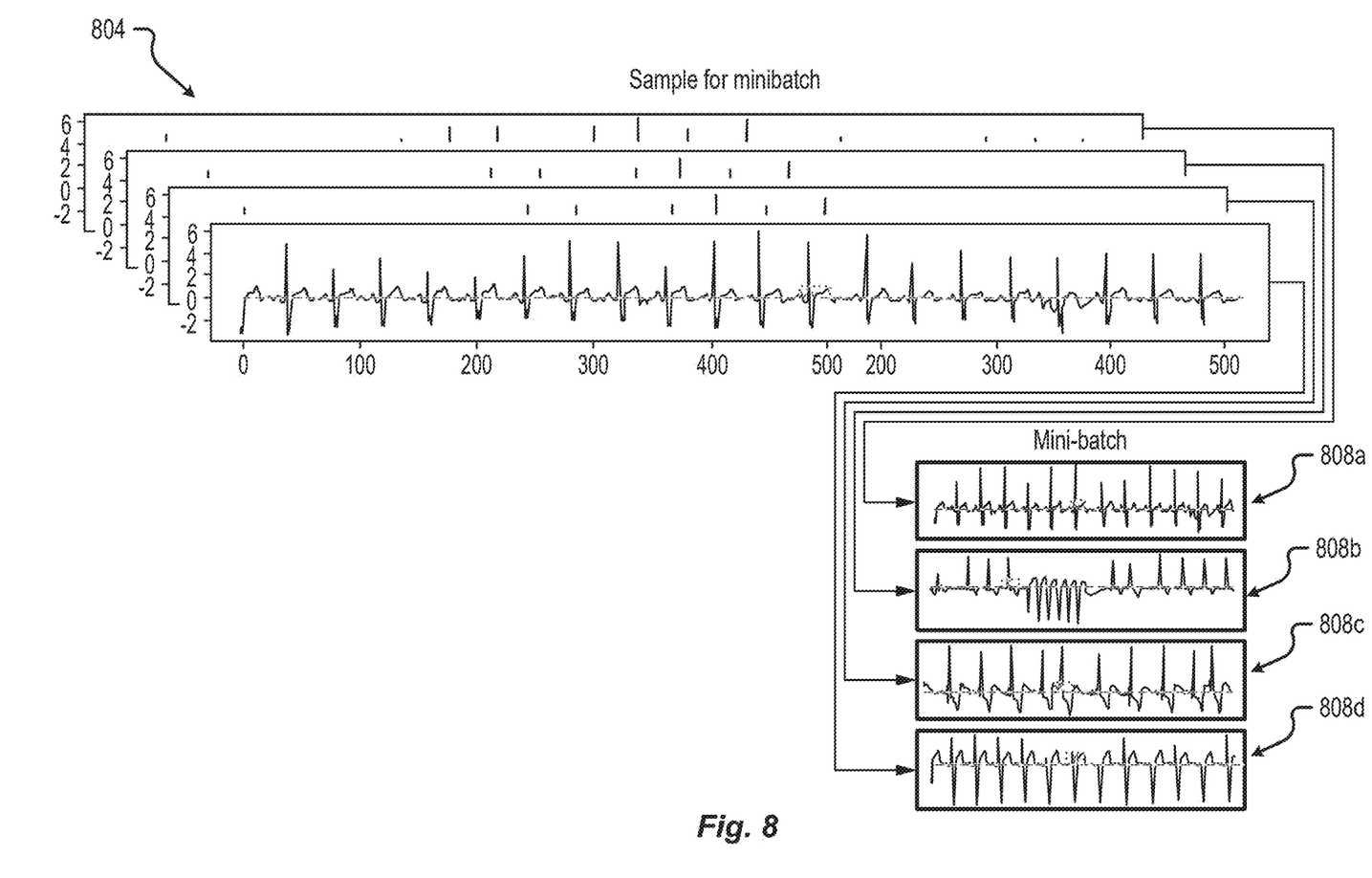
FIG. 8 illustrates the use of mini-batches to support model training in accordance with at least some embodiments of the present disclosure.

By providing multiple different cropped waveforms 708, 712, 716, each having the same beat annotated (and thereby having the same number of annotations), it may become possible to deploy a cropping strategy that works well with stochastic gradient descent (SGD) methods, which utilize the construction of mini-batches. Examples of mini-batches are shown in further detail in FIG. 8. The parameters of the model, θ, can be optimized with one gradient step on a minibatch. During mini-batch construction each full sample 804 may be cropped (e.g., randomly, pseudorandomly, or with user input) as illustrated in FIG. 8. Into a plurality of mini-batch waveforms 808a, 808b, 808c, 808d. Although FIG. 8 illustrates four mini-batches 808a, 808b, 808c, 808d, it should be appreciated that embodiments of the present disclosure may utilize a greater or lesser number of mini-batches without departing from the scope of the present disclosure.

In some embodiments, at each step of SGD, a mini-batch may be constructed without having to explicitly store every possible cropping. Instead minibatches are constructed as described above on demand during the epochs/iterations of the SGD methods. The illustrated approach is shown for use in the construction of models that generate heatmaps for the R fiducial. It should be appreciated that such approaches can be generalized to other fiducials (e.g., P, Q, S, T) using an appropriate weighting strategy and the trained heatmap estimator. For example, in each waveform, locations of the R fiducial may be detected by finding peaks with the machine learning model trained to estimate the heatmap for the R fiducial. Then for estimation of other fiducials (e.g., P, Q, S, T), a different weighting strategy as shown in FIG. 9A and/or 9B may be used per waveform.

Figure 9A:
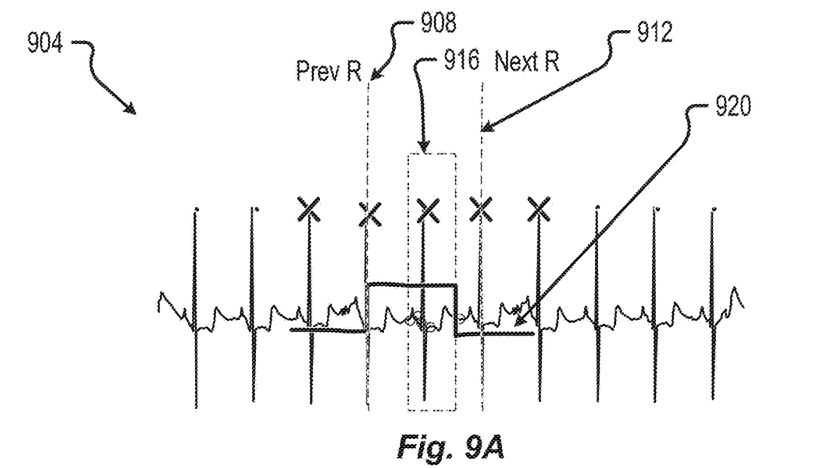
FIG. 9A illustrates waveform annotations and a first weighting applied thereto in accordance with embodiments of the present disclosure.
Figure 9B:
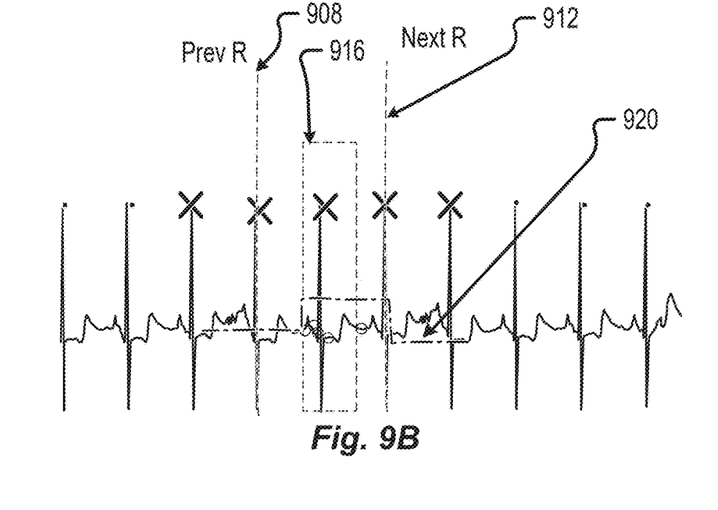
FIG. 9B illustrates waveform annotations and a second weighting applied thereto in accordance with embodiments of the present disclosure.

As shown in FIG. 9A, the waveform 904 includes an annotated beat 916 in yellow. Bounds 908, 912 are placed around the annotated beat 916 to ensure that the entirety of one beat is within a window and to ensure that an appropriate weighting function 920 is applied to capture the annotated beat 916. In this example, the previous and next R fiducials are still marked in red, but some of the R fiducials lie outside the bounds 908, 912. The heatmaps for other fiducials (e.g., a P fiducial or Q fiducial) would follow Equation (0) as decaying functions centered at their respective locations. The weighting 920 is shown in Red. In particular the weights are one (1) from the previous R fiducial up until the end of the current beat 916. Outside of the bounds (908 to the end of 916), the weighting is zero (0). The interval is selected as at least one (1) so as to guaranteed to have at least one P fiducial and at least one Q fiducial in the specified range contained within the bounds 908, 912. Thus, a heatmap generated with this approach would be valid in the bounded region but not outside.

Similarly, as shown in FIG. 9B, for an S fiducial and T fiducial, a weighting 920 is applied that is one (1) from the start of the beat 916 until the next R fiducial, which coincides with the end bound 912. Often the P fiducial or T fiducial may be absent from a waveform 904, due to underlying cardiac issues of a patient. In this case, the heatmap would simply be zero (0), while the weighting would be the same. If the P fiducial is absent, then the Q fiducial would become the start of the beat 916. Similarly, if the T fiducial is absent, then the S fiducial becomes the end of the beat 916.

Figure 10:
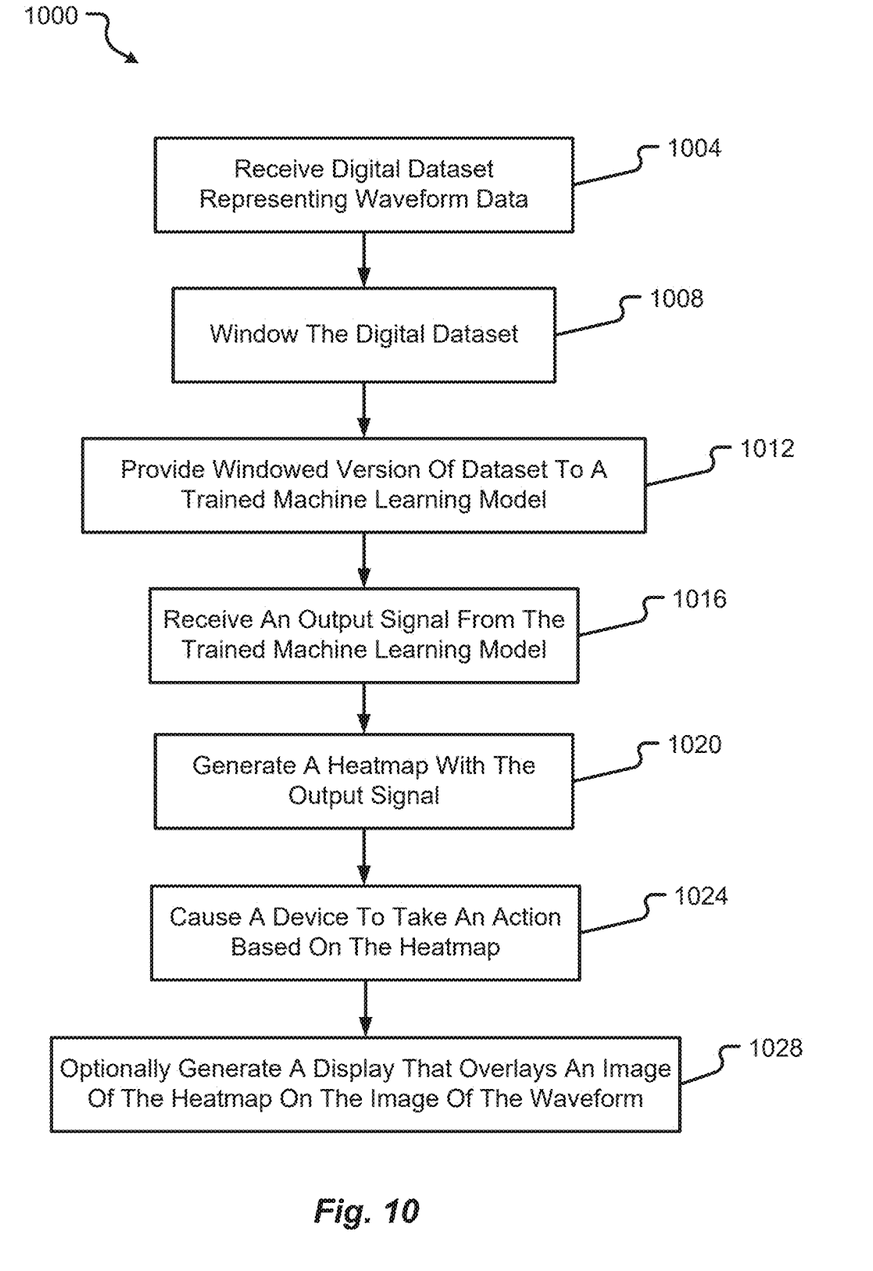
FIG. 10 is a flow diagram illustrating a method of generating a heatmap based on a windowed digital dataset in accordance with embodiments of the present disclosure.

Referring now to FIG. 10, a method 1000 of transforming a waveform to a heatmap will be described in accordance with at least some embodiments of the present disclosure. The method 1000 begins when a digital dataset representing waveform data is received at a heatmap generation and processing server 108 (step 1004). The method 1000 continues with the heatmap generation and processing server 108 invoking the windowing instructions 156 to window the waveform. In windowing the waveform, the windowing instructions 156 may apply a weighting function as shown in Equation (2). In some embodiments, the waveform may have one or more annotated fiducials that are contained within the windowed version of the waveform.

The windowed version of the waveform is then provided from the windowing instructions 156 to one or more trained machine learning models 176 (step 1012). The trained machine learning models 176 may then process the windowed version of the waveform and generate an output in response thereto. This output may be provided to the heatmap analysis instructions 160 for further processing and analysis (step 1016). In some embodiments, the output of the trained machine learning model 176 may correspond to a heatmap that aligns one or more peaks of the heatmap with annotated fiducials in the windowed version of the waveform. The heatmap, in some embodiments, may correspond to an estimated or predicted heatmap. In some embodiments, the trained machine learning model 176 may identify locations where a heatmap peak should be present, based on a processing of the windowed waveform, and then the heatmap analysis instructions 160 may generate an appropriate heatmap based on the information received from the trained machine learning model 176 (step 1020).

The heatmap analysis instructions 160 may then analyze the heatmap to determine if one or more steps should be taken (step 1024). In some embodiments, the analysis may include comparing data from the heatmap (e.g., locations of fiducials, number of peaks, space between peaks, etc.) with action selection criteria. If the data from the heatmap satisfied one or more action selection criteria, then the method 1000 may include causing a device to take an action (e.g., an automated or semi-automated action) based on the analysis of the heatmap and in accordance with the action selected. Examples of actions that may be initiated in response to analyzing a heatmap generated from a windowed version of the waveform include, without limitation, device alerts, message generation, message transmission, instruction distribution, alarm sounding, etc.

The method 1000 may also include an optional step of generating a display that overlays an image of the heatmap on the image of the waveform (step 1028). The image generated and displayed in step 1028 may overlay the heatmap on a full version of the waveform or a windowed version of the waveform. Examples of such displays are shown in FIGS. 6 and 7. Displaying the images simultaneously on a user device 120 may enable a user to visually inspect the heatmap and waveform themselves as part of performing a human analysis, as part of validating an output of the trained machine learning model 176, and/or as part of approving an action that was recommended at step 1024.

Figure 11:
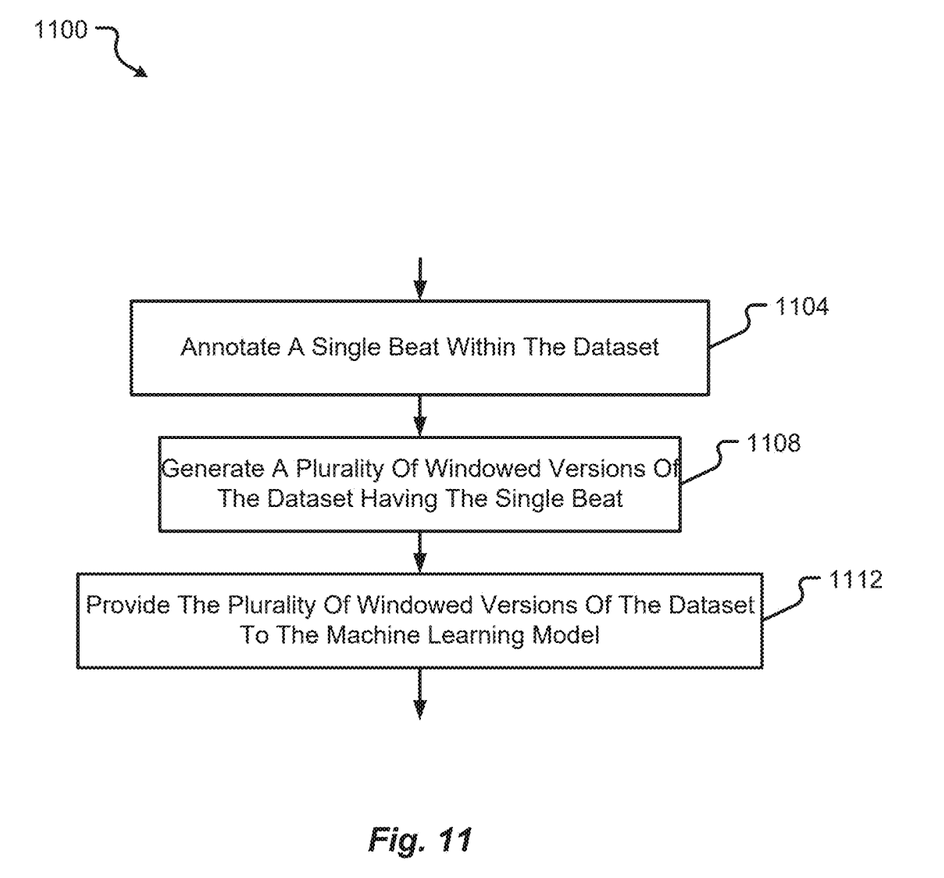
FIG. 11 is a flow diagram illustrating a method of generating a plurality of windowed versions of a dataset in accordance with at least some embodiments of the present.

With reference now to FIG. 11, additional details of a method 1100 for generating a plurality of windowed version of a dataset will be described in accordance with at least some embodiments of the present disclosure. The method 1100 may be utilized independently or as part of one or more other methods depicted and described herein. The method 1100 may include annotating a single beat within a digital dataset representing waveform data (step 1104). In some embodiments, one or multiple fiducials may be annotated in one or more beats of the waveform. In some embodiments, less than all fiducials are annotated.

The method 1100 may then include generating a plurality of windowed version of the dataset having the single beat (step 1108). Examples of this step are depicted in FIG. 7, where a waveform 706 can be windowed to have different bounds. As discussed in connection with FIG. 7, the plurality of windowed versions of the waveform 708, 712, 716 may be of the same size or different size, may have the same number of beats contained therein, may have a different number of beats contained therein, may have the location of the annotated beat at different locations, etc.

The method 1100 may then continue by providing the plurality of windowed version of the waveform to a model training server 132 for use as training data 228 (step 1112). In some embodiments, the plurality of windowed versions of the waveform may be provided to a candidate machine learning model 224 as part of training that candidate machine learning model 224.

Figure 12:
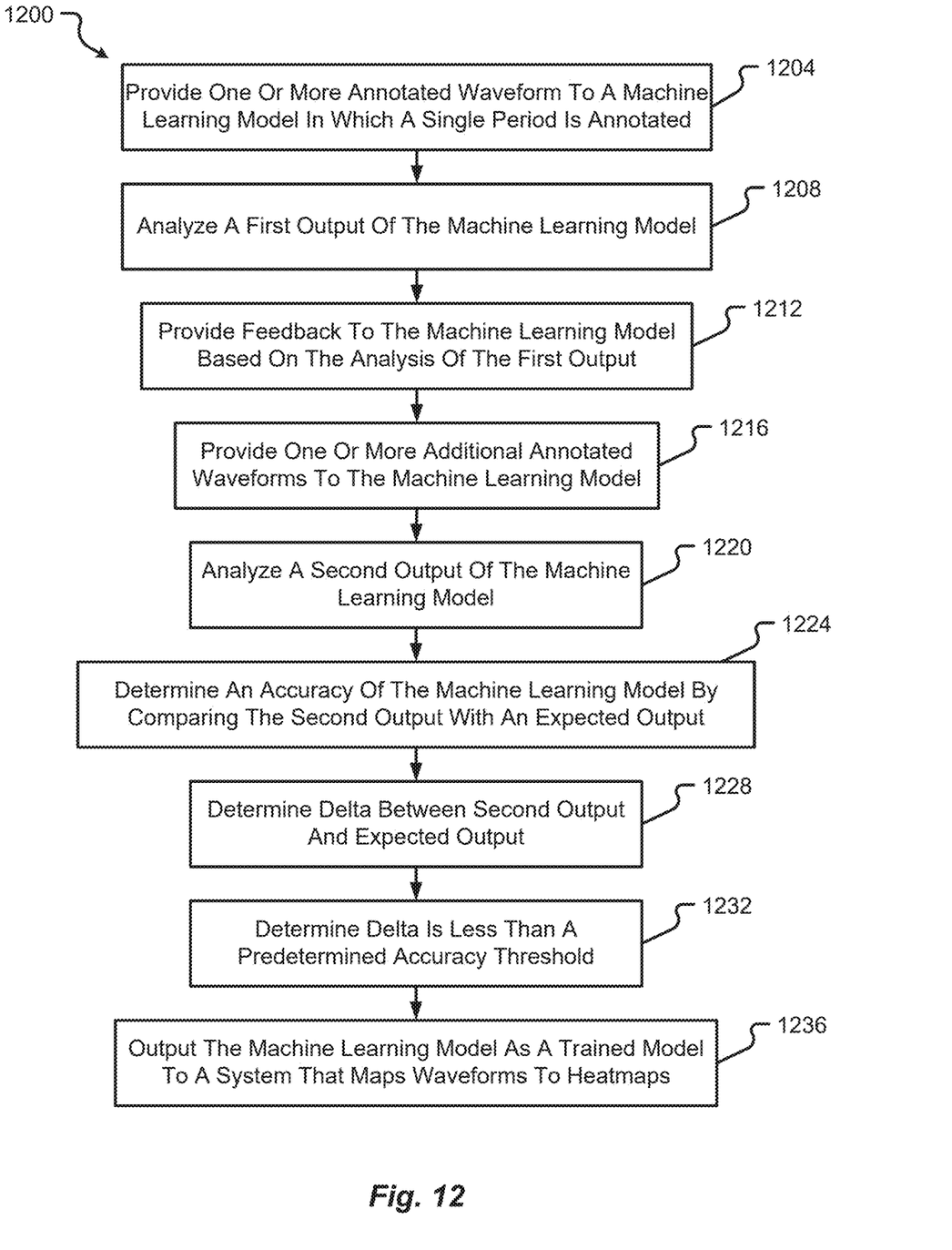
FIG. 12 is a flow diagram illustrating a method of training a machine learning model to map waveforms to heatmaps in accordance with at least some embodiments of the present disclosure.

Referring now to FIG. 12, additional details of a method 1200 for training a candidate machine learning model 224 will be described in accordance with at least some embodiments of the present disclosure. The method 1200 may be utilized independently or as part of one or more other methods depicted and described herein. The method 1200 may include providing one or more annotated waveforms to a candidate machine learning model 224 (step 1204). In some embodiments, the one or more annotated waveforms may have less than all beats thereof annotated and/or may have less than all fiducials annotated therein. In some embodiments, a single period of the waveform may be annotated. In some embodiments, a single fiducial is annotated within the single period of the waveform. In some embodiments, two periods (e.g., adjacent periods or adjacent beats) of the waveform are annotated. In some embodiments, a single fiducial is annotated within the two periods of the waveform.

After the candidate machine learning model 224 processes the annotated waveform, the output of the candidate machine learning model 224 may be analyzed at a first instance (step 1208). In some embodiments, the feedback/training engine 232 may work in cooperation with the machine learning model management 236 to analyze the first output of the candidate machine learning model 224 for accuracy and/or confidence information. The analysis may also include a human analysis of the output. In some embodiments, a heatmap generated with the output of the candidate machine learning model 224 may be analyzed to determine if it accurately aligns one or more peaks with one or more annotated fiducials from the waveform provided to the candidate machine learning model 224.

The method 1200 may continue by providing feedback to the candidate machine learning model 224 (step 1212). The feedback provided to the candidate machine learning model 224 may include indications of accurate results, indications of inaccurate results, indications of suggested new locations for a heatmap peak (e.g., how to move a heatmap peak), etc.

The method 1200 may then continue by providing one or more additional annotated waveforms to the candidate machine learning model 224 (step 1216). The one or more additional annotated waveforms may correspond to different windowed versions of the same waveform (e.g., as depicted and described in FIGS. 7 and 11). The one or more additional annotated waveforms may also correspond to new waveforms obtained from the digital waveform database 112.

The candidate machine learning model 224 may process the one or more additional annotated waveforms and produce additional (e.g., a second) outputs, which are then analyzed similarly to step 1208 (step 1220). Part of the analysis performed in step 1220 may include determining whether or not the candidate machine learning model 224 is producing outputs or heatmaps that comply with a predetermined accuracy requirement. In some embodiments, the method 1200 may include determining an accuracy of the output(s) generated by the candidate machine learning model 224 by comparing the second output with an expected output (step 1224). A difference or delta between the second output and the expected output may be determined (step 1228) and compared with a predetermined accuracy threshold (step 1232). If the difference or delta is within the predetermined accuracy threshold, then the method 1200 will continue with the model training server 132 outputting the candidate machine learning model 224 to the heatmap generation and processing sever 108 for use as a trained machine learning model 176 (step 1236). In some embodiments, the trained machine learning model 176 may replace or supplement an existing trained machine learning model.

It should be appreciated that any combination of signal processing and/or model training depicted and described herein can be performed without departing from the scope of the present disclosure. Alternatively, or additionally, any number of other processes can be developed by combining various portions or sub-steps of the described processes without departing from the scope of the present disclosure.

Specific details were given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Based on the discussion above regarding various aspects or embodiments, there are numerous additional considerations that should be further appreciated.

What is claimed is:

1. A method of training a machine learning model to produce a heatmap, the method comprising:
    providing an annotated waveform to the machine learning model in which a single period is annotated with one or more fiducials;
    analyzing a first output of the machine learning model generated in response to the machine learning model processing the annotated waveform;
    providing feedback to the machine learning model based on the analysis of the first output;
    providing one or more additional annotated waveforms to the machine learning model, wherein the one or more additional annotated waveforms comprise a single period annotated with a specific fiducial;
    analyzing a second output of the machine learning model generated in response to the machine learning model processing the additional annotated waveform;
    determining an accuracy of the machine learning model by comparing the second output with an expected second output to obtain delta that represents the accuracy of the machine learning model;
    determining that the delta is less than a predetermined accuracy threshold; and
    in response to determining that the delta is less than a predetermined accuracy threshold, outputting the machine learning model to a system that maps waveforms to the heatmap.

2. The method of claim 1, wherein the one or more additional annotated waveforms comprise a plurality of windowed waveforms and wherein each of the plurality of windowed waveforms are cropped based on time and/or a number of beats.

3. The method of claim 1, wherein the annotated waveform and the one or more additional annotated waveforms each correspond to an electrocardiogram (ECG) waveform, wherein the heatmap indicates a location and presence of the specific fiducial, and wherein the fiducial comprises at least one of a P, Q, R, S, and T fiducial.

4. The method of claim 1, wherein the system maps electrocardiogram (ECG) waveforms.

5. The method of claim 1, wherein the one or more additional annotated waveforms comprise a plurality of waveforms, the method further comprising:
    windowing each of the plurality of waveforms such that each of the windowed plurality of waveforms contains the single period annotated with the specific fiducial, such that each of the windowed plurality of waveforms comprise a common number of beats, and such that two or more of the windowed plurality of waveforms contains the single period at a different beat location.

* * * * *